(12) United States Patent
Ishibashi et al.

(10) Patent No.: US 7,867,414 B2
(45) Date of Patent: Jan. 11, 2011

(54) METHOD OF MANUFACTURING A BIREFRINGENT FILM, OPTICAL FILM USING THE SAME, LIQUID CRYSTAL PANEL, LIQUID CRYSTAL DISPLAY DEVICE AND IMAGED DISPLAY DEVICE

(75) Inventors: Kuniaki Ishibashi, Ibaraki (JP); Hiroyuki Yoshimi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 63 days.

(21) Appl. No.: 11/244,159

(22) Filed: Oct. 6, 2005

(65) Prior Publication Data

US 2006/0078693 A1    Apr. 13, 2006

(30) Foreign Application Priority Data

Oct. 7, 2004  (JP) ............................. 2004-294620
Feb. 10, 2005  (JP) ............................. 2005-034645

(51) Int. Cl.
*B29C 55/08* (2006.01)

(52) U.S. Cl. ............................ 264/2.7; 349/117; 428/1.3

(58) Field of Classification Search .................. 428/1.3, 428/1.31, 1.33, 1.5, 1.54; 264/291, 289.6, 264/1.34, 479, 342 R, 342 RE, 2.7; 349/117–121; 524/481–482, 553; 525/210
See application file for complete search history.

(56) References Cited

U.S. PATENT DOCUMENTS 3,229,175 A * 1/1966 Strandberg ...................... 318/6
5,241,030 A    8/1993 Barry et al.
5,245,456 A * 9/1993 Yoshimi et al. ............. 349/118

(Continued)

FOREIGN PATENT DOCUMENTS

EP    1 160 591 A1    12/2001

(Continued)

OTHER PUBLICATIONS

JPO Website Machine English Translation of JP2002-269781, Nakajima Hiroshi, Apr. 8, 2004.*

(Continued)

*Primary Examiner*—Sophie Hon
(74) *Attorney, Agent, or Firm*—Westerman, Hattori, Daniels & Adrian, LLP

(57) ABSTRACT

A method of manufacturing a birefringent film includes stretching a polymer film in a widthwise direction while at the same time shrinking the same in a lengthwise direction so as to satisfy the relational expression: $(1/STD)^{1/2} \leq SMD < 1$, in which the length in the widthwise direction and the length in the lengthwise direction, of the polymer film before being stretched are respectively designated as 1, and STD represents a change ratio of the length in the widthwise direction of the polymer film due to stretching and SMD represents a change ratio of the length in the lengthwise direction of the polymer film due to shrinking, and make the stretched polymer film have an Nz coefficient of 0.9-1.1. This method achieves manufacturing of a birefringent film with a high production efficiency, while omitting the bowing phenomenon when manufacturing a birefringent film by stretching a polymer film in the widthwise direction, thereby limiting unevenness in birefringence, retardation and orientation angle and hence producing excellent optical characteristics, as well as achieving successive lamination when laminating with a polarizing film.

2 Claims, 1 Drawing Sheet

U.S. PATENT DOCUMENTS

| | | | |
|---|---|---|---|
| 5,366,682 A | | 11/1994 | Morikawa et al. |
| 5,402,556 A | * | 4/1995 | Rutz .............................. 26/73 |
| 5,430,565 A | * | 7/1995 | Yamanouchi et al. ....... 349/120 |
| 5,519,523 A | | 5/1996 | Madokoro et al. |
| 5,999,243 A | | 12/1999 | Kameyama et al. |
| 6,542,300 B2 | | 4/2003 | Umemoto |
| 6,606,193 B2 | | 8/2003 | Umemoto |
| 6,760,157 B1 | | 7/2004 | Allen et al. |
| 7,075,604 B2 | | 7/2006 | Yano et al. |
| 2002/0008840 A1 | * | 1/2002 | Sakamaki et al. ........... 349/194 |
| 2002/0130997 A1 | | 9/2002 | Yano et al. |
| 2002/0190406 A1 | | 12/2002 | Merrill et al. |
| 2003/0020208 A1 | * | 1/2003 | Tasaka et al. ................ 264/217 |
| 2004/0022965 A1 | | 2/2004 | Sakamaki et al. |
| 2004/0052937 A1 | | 3/2004 | Ito et al. |
| 2004/0058093 A1 | * | 3/2004 | Nakashima ................. 428/1.1 |
| 2004/0099992 A1 | | 5/2004 | Merrill et al. |
| 2004/0119178 A1 | | 6/2004 | Kuwamura |
| 2004/0241344 A1 | * | 12/2004 | Kawanishi et al. ........... 428/1.1 |
| 2005/0018328 A1 | | 1/2005 | Hata et al. |
| 2005/0099562 A1 | | 5/2005 | Nishikouji et al. |
| 2005/0213012 A1 | | 9/2005 | Yano et al. |
| 2006/0077326 A1 | | 4/2006 | Ishibashi et al. |
| 2006/0078693 A1 | | 4/2006 | Ishibashi et al. |
| 2006/0262401 A1 | | 11/2006 | Takahashi et al. |
| 2006/0275559 A1 | * | 12/2006 | Ishibashi et al. ........... 428/1.31 |

FOREIGN PATENT DOCUMENTS

| | | |
|---|---|---|
| JP | H02-191904 A | 7/1990 |
| JP | H03-23405 A | 1/1991 |
| JP | 5-11114 A | 1/1993 |
| JP | H05-249316 A | 9/1993 |
| JP | 6-51119 A | 2/1994 |
| JP | H06-51116 A | 2/1994 |
| JP | 8-511812 | 12/1996 |
| JP | 10-508048 | 8/1998 |
| JP | 2000-190385 A | 7/2000 |
| JP | 2000-511296 | 8/2000 |
| JP | 2001-49110 | 2/2001 |
| JP | 2001-343529 | 12/2001 |
| JP | 2002-90530 A | 3/2002 |
| JP | 2002-296422 | 10/2002 |
| JP | 2003-315554 A | 11/2003 |
| JP | 2004-144942 A | 5/2004 |
| KR | 1991-0000870 A | 1/1991 |
| KR | 2003-0022791 A | 3/2003 |
| TW | 457390 B | 10/2001 |
| TW | 571332 B | 1/2004 |
| WO | WO 94/24191 | 10/1994 |
| WO | WO 96/11967 | 4/1996 |
| WO | WO 97/44704 | 11/1997 |

OTHER PUBLICATIONS

T. Yamada et al., "Analyses of Bowing Phenomena in Successive Transverse Stretching and Thermosetting Process for Biaxially Oriented Film", Intern. Polymer Processing Vo. X Issue 4, pp. 334-340, 1995, Hanser Publishers.

Office Action of Korean Patent Application No. 10-2005-7019368 mailed Oct. 31, 2006.

Japanese Office Action dated Oct. 14, 2008 (mailing date), issued in Japanese Patent Application No. 2003-418558.

Machine translation of JP-04-305602. Oct. 28, 1992. Umemoto et al.

Machine translation of JP-2000-131693. May 2000. Omuro et al.

Machine translation of JP-2005-181450. Jul. 7, 2005. Ishibashi et al.

Japanese Office Action dated Feb. 19, 2010, issued in corresponding Japanese Patent Application No. 2005-034645.

Chinese Office Action dated Jul. 6, 2007 issued in corresponding Application No. 200510108461.1.

Taiwanese Office Action dated Oct. 19, 2010, issued in corresponding Taiwanese Patent Application No. 094135281.

* cited by examiner

METHOD OF MANUFACTURING A BIREFRINGENT FILM, OPTICAL FILM USING THE SAME, LIQUID CRYSTAL PANEL, LIQUID CRYSTAL DISPLAY DEVICE AND IMAGED DISPLAY DEVICE

CROSS REFERENCE TO RELATED APPLICATION

This application claims priority from Japanese Patent Application Nos. 2004-294620 and 2005-034645, which are incorporated herein by reference.

BACKGROUND OF THE INVENTION

1. Field of the Invention

The present invention relates to a method of manufacturing a birefringent film, as well as an optical film using the same and a variety of image display devices.

2. Discussion of the Background

For the purpose of improving the image display quality such as through compensation for the hue coloring or widening the viewing angle in a variety of image display devices such as a liquid crystal display (LCD) device, a birefringent film is generally used. The birefringent film used for such a purpose is manufactured by using a polymer film, which is subjected to a uniaxial or biaxial stretching process to have its birefringence and retardation adjusted.

When using the thus manufactured birefringent film along with a polarizing film in an LCD device, these films are required to be arranged to have a slow axis of the birefringent film oriented substantially at right angles to an absorption axis of the polarizing film. In general, the slow axis of the birefringence film corresponds to its stretching direction, while the absorption axis of the polarizing film corresponds to its stretching direction.

Meanwhile, when a polymer film is industrially stretched, it is general to have a lengthwise polymer film subjected to the stretching treatment, while moving the same in the lengthwise direction so as to have it rolled up. When the thus rolled birefringent film and the rolled polarizing film are to be laminated together, they are respectively fed from the rolls so as to have their lateral sides (longitudinal edges) respectively positioned parallel to each other, and successively laminated together (so called roll to roll lamination). For this operation, it is necessary to stretch the polarizing film in the lengthwise direction, while stretching the birefringent film in the widthwise direction.

However, the following problem may arise during the manufacturing by arranging the birefringent film and the polarizing film in the above manner. For example, in manufacturing the birefringent film, a so-called bowing phenomenon is likely to be caused when successively stretching a polymer film in the widthwise direction, which phenomenon skews the in-plane orientation axis to the form of a bow. Therefore, it is difficult to uniformly cause the orientation axis, the birefringence and the retardation to a film by the stretching in the widthwise direction.

In light of the above, a technique of stretching a polymer film in the widthwise direction as employed includes applying a relaxing treatment to a polymer film after stretching in the widthwise direction so as to relax it back to an original width, thereby improving the uniformity of the slow axis with respect to the widthwise (stretching) direction. According to this method, a polymer film, which has been laminated on a substrate, is extended along with the substrate and then the substrate is relaxed (loosened) back to the original width so as to shrink the film in the relaxing treatment. A problem is that some types of polymer film produce only a small relaxing effect and therefore it is difficult to efficiently manufacture a birefringent film in an industrially stable manner. Although an attempt was made to reduce the bowing phenomenon by cooling after stretching treatment, this phenomenon cannot be completely avoided, as described such as in a nonpatent literature (T. Yamada et al. Intn. Polym. Process., Vo. X, Issue 4, 334-340 (1995)).

According to another technique to overcome the above problem, a substrate with a polymer film laminated thereon is relaxed between chucks of a tenter stretching machine, and the substrate is subjected to heat treatment, as disclosed such as in Japanese Patent Application Publication No. Hei. 06-51116. This technique causes problems that the substrate is limited to a material of the type that has a heat shrinkability, and a substrate, particularly a substrate having an excessively large thickness, may be wrinkled after the relaxing treatment, thereby causing uneven birefringence in the polymer film. Also, other techniques, which focus on adjustment of the stretching conditions, include a technique of setting the width of a stretching film as a square root of the stretching ratio (as disclosed such as in Japanese Patent Application Publication No. Hei. 03-23405), a technique of regulating the shrinking range resulting from the lengthwise stretching (as disclosed such as in Japanese Patent Application Publication No. Hei. 02-191904), and a technique of applying thermal relaxation after the stretching (as disclosed such as in Japanese Patent Application Publication No. Hei. 05-249316).

In consideration of the above problems, it is an object of the present invention to provide a method of manufacturing a birefringent film that is capable of manufacturing a birefringent film with a high production efficiency, while omitting the bowing phenomenon when manufacturing a birefringent film by stretching a polymer film in the widthwise direction, thereby limiting unevenness in birefringence, retardation and orientation angle and hence producing excellent optical characteristics, as well as achieving successive lamination (so-called roll to roll lamination) when laminating with a polarizing film.

SUMMARY OF THE INVENTION

The present inventors have repeatedly made investigations earnestly to solve the above problems, and found that the above problems can be solved by stretching a polymer film in the widthwise direction while at the same time shrinking the same in the lengthwise direction, as well as making the degree of the stretching in the widthwise direction and the degree of the shrinking in the lengthwise direction satisfy a given relational expression, and making the stretched polymer film satisfy a given Nz coefficient. Thus, the present invention has been achieved.

According to the present invention, there is provided a method of manufacturing a birefringent film that includes stretching a polymer film in a widthwise direction while at the same time shrinking the same in a lengthwise direction so as to satisfy the relational expression: $(1/STD)^{1/2} \leq SMD < 1$, in which the length in the widthwise direction and the length in the lengthwise direction, of the polymer film before being stretched are respectively designated as 1, and STD represents a change ratio of the length in the widthwise direction of the polymer film due to stretching and SMD represents a change ratio of the length in the lengthwise direction of the polymer film due to shrinking, and make the stretched polymer film have an Nz coefficient of 0.9-1.1. Herein, the Nz coefficient is represented by $Nz=(nx-nz)/(nx-ny)$, in which nx: maximum in-plane refractive index, ny: refractive index in a direction crossing at right angles to an in-plane nx direction that gives the maximum in-plane refractive index, and nz: refractive index in a direction crossing at right angles to a refractive index angle of nx and a refractive index angle of ny and thicknesswise refractive index.

With a birefringent film manufactured by stretching a polymer film in a widthwise direction while at the same time shrinking the same in a lengthwise direction so as to satisfy the relational expression: $(1/STD)^{1/2} \leq SMD < 1$, in which the length in the widthwise direction and the length in the lengthwise direction, of the polymer film before being stretched are respectively designated as 1, and STD represents a change ratio of the length in the widthwise direction of the polymer film due to stretching and SMD represents a change ratio of the length in the lengthwise direction of the polymer film due to shrinking, and make the stretched polymer film have an Nz coefficient of 0.9-1.1, it is possible to produce excellent optical characteristics with limited unevenness such as in birefringence, retardation and orientation angle, have orientation angles of the slow axis uniform to the widthwise direction (stretching direction) of the film, and thus achieving successive lamination (so called roll to roll lamination) with a polarizing film.

In a method of manufacturing a birefringent film according to the present invention, it is preferable to apply the stretching and shrinking treatments to the polymer film or a laminate with a substrate on which the polymer film is laminated.

Further, in a method of manufacturing a birefringent film according to the present invention, the polymer film preferably contains at least one selected from the group consisting of norbornene type resin, polycarbonate type resin and cellulose type resin.

In an optical film of the present invention, it is preferable to laminate the birefringent film and the polarizing film to have opposite lateral sides (longitudinal edges) of the birefringent film respectively positioned parallel to opposite lateral sides (longitudinal edges) of the polarizing film so as to have a slow axis of the birefringent film oriented at an angle of 85 degrees to 95 degrees to an absorption axis of the polarizing film. As long as the angle falls within the range of 85 degrees to 95 degrees, it is possible to enhance the display quality of an LCD device using the thus obtained optical film.

According to the method of manufacturing a birefringent film of the present invention, it is possible to manufacture a birefringent film with a high production efficiency, while limiting unevenness in birefringence, retardation and orientation angle and hence producing excellent optical characteristics, as well as achieving successive lamination (so-called roll to roll lamination) when laminating with a polarizing film. Also, it is possible to improve the display characteristics of an LCD device or any other image display devices thanks to the excellent characteristics of the birefringent film thus obtained by the manufacturing method of the present invention.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Figure 1:
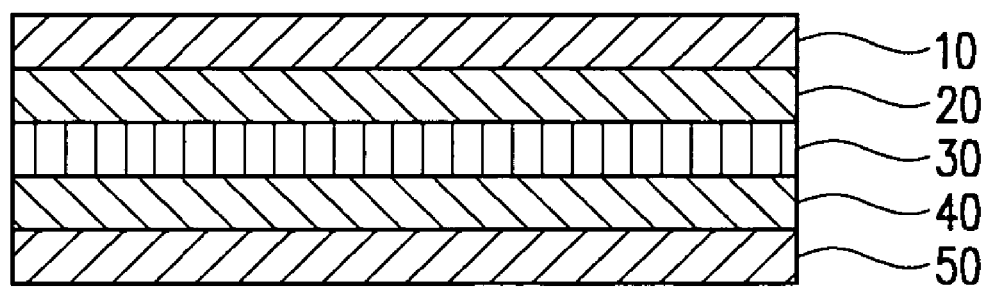
FIG. 1 is a sectional view of a liquid crystal panel with a birefringent film mounted therein used in Evaluation Tests.

According to the present invention, a method of manufacturing a birefringent film includes stretching a polymer film in a widthwise direction while at the same time shrinking the same in a lengthwise direction so as to satisfy the relational expression: $(1/STD)^{1/2} \leq SMD < 1$, in which the length in the widthwise direction and the length in the lengthwise direction, of the polymer film before being stretched are respectively designated as 1, and STD represents a change ratio of the length in the widthwise direction of the polymer film due to stretching and SMD represents a change ratio of the length in the lengthwise direction of the polymer film due to shrinking, and make the stretched polymer film have an Nz coefficient of 0.9-1.1.

In this embodiment, while the stretching ratio of the lengthwise direction (MD) of a polymer film subsequently varies depending on the stretching ratio of the widthwise direction (TD), it is preferable to have SMD within the range of $(1/STD)^{1/2}$ to $(1/STD)^{1/2} \times 1.05$ in the relative expression of $(1/STD)^{1/2} \leq SMD < 1$, in which STD represents a change ratio of the length in the widthwise direction of the polymer film due to stretching and SMD represents a change ratio of the length in the lengthwise direction of the polymer film due to shrinking. When in "SMD=1", that is, when the length in the lengthwise direction is not changed, it is not possible to solve a problem of causing the bowing phenomenon. When in "$(1/STD)^{1/2} > SMD$", there still remains a problem to cause wrinkling in the widthwise direction.

In this embodiment, the polymer film after having been stretched has an Nz coefficient of 0.9-1.1 and preferably 0.95-1.05. When the Nz coefficient of the stretched polymer film is less than 0.9, the polymer film is wrinkled, and thus is hard to be used as an optical film. When the Nz coefficient of the stretched polymer film exceeds 1.1, a liquid crystal panel with the polymer film mounted therein has a lowered viewing angle. Herein, the Nz coefficient is represented by $Nz = (nx - nz)/(nx - ny)$, in which nx: maximum in-plane refractive index, ny: refractive index in a direction crossing at right angles to an in-plane nx direction that gives the maximum in-plane refractive index, and nz: refractive index in a direction crossing at right angles to a refractive index angle of nx and a refractive index angle of ny and a thicknesswise refractive index. That is, the Nz coefficient can be determined by Rth/×nd from the in-plane retardation ($\Delta nd = (nx - ny) \times d$) and the thicknesswise retardation ($Rth = (nx - nz) \times d$), in which nx, ny and nz respectively represent refractive indices in an X axis (slow axis), a Y axis and a Z axis, of the birefringent film, the X axis being an axis that gives a maximum in-plane refractive index, the Y axis being an in-plane axis perpendicular to the X axis, the Z axis representing a thickness direction perpendicular to the X axis and the Y axis, and d represents the thickness of the birefringent film.

A stretching treatment and a shrinking treatment which are to be made simultaneously can be directly applied independently to a polymer film. Or, it is also possible to indirectly apply the stretching and shrinking treatments to a polymer film, which is laminated on a substrate to have a laminate, by holding the opposite ends of the substrate of the laminate and simultaneously applying the stretching and shrinking treatments to the substrate. Further, the simultaneous application of the stretching and shrinking treatments is possible to be made for a laminate, which is prepared by laminating a polymer film on a substrate, by holding the opposite ends of the laminate.

Examples of the polymer film used include polycarbonate type resin, cellulose type resin and norbornene type resin.

The polymer film preferably has light transmittance or the like, and, for example, preferably has a light transmittance of 85% or more and more preferably 90% or more. It is also preferable to cause less irregular orientation.

Examples of the norbornene type resin include: (1) a resin obtained by hydrogenating a ring-opened (co)polymer of norbornene type monomer after polymer denaturation such as addition of maleic acid, addition of cyclopentadiene, according to needs and circumstances; (2) a resin obtained by addition polymerization of a norbornene type monomer; (3) a resin obtained by addition polymerization of a norbornene type monomer and an olefin type monomer such as ethylene or α-olefin; and so on. Polymerization methods and hydrogenating methods may be made following the conventional procedures.

Examples of the norbornene type monomer include: norbornene, and its alkyl and/or alkylidene-substituted compounds thereof, such as 5-methyl-2-norbornene, 5-dimethyl-2-norbornene, 5-ethyl-2-norbornene, 5-butyl-2-norbornene, 5-ethylidene-2-norbornene, polar radical-substituted compounds, or polar substituents thereof such as a halogen; dicyclopentadiene, 2,3-dihydrodicyclopentadiene or the like; dimethanooctahydronaphthalene, and alkyl and/or alkylidene-substituted compound thereof, or polar substituents thereof such as a halogen, such as 6-methyl-1,4:5,8-dimethanol-1,4,4a,5,6,7,8,8a-octahydronaphthalene, 6-ethyl-1,4:5,8-dimethanol-1,4,4a,5,6,7,8,8a-octahydronaphthalene, 6-ethylidene-1,4:5,8-dimethanol-1,4,4a,5,6,7,8,8a-octahydronaphthalene, 6-chloro-1,4:5,8-dimethanol-1,4,4a,5,6,7,8, 8a-octahydronaphthalene, 6-cyano-1,4:5,8-dimethano-1,4, 4a,5,6,7,8,8a-octahydronaphthalene, 6-pyridyl-1,4:5,8-dimethanol-1,4,4a,5,6,7,8,8a-octahydronaphthalene, 6-methoxycarbonyl-1,4:5,8-dimethanol-1,4,4a,5,6,7,8,8a-octahydronaphthalene, or the like; trimers and tetramers of cyclopentadiene such as 4,9:5,8-dimethano-3a,4,4a,5,8,8a,9, 9a-octahydro-1H-benzoindene, 4,11:5,10:6,9-trimethanol-3a,4,4a,5,5a,6,9,9a,10,10a,11,11a-dodecahydro-1H-cyclopentaanthracene.

The norbornene type resin generally has a number average molecular weight (Mn) ranging from 25,000-200,000, preferably from 30,000 to 100,000, and more preferably from 40,000 to 80,000, as measured by gel permeation chromatography (GPC) using toluene as a solvent. When the number average molecular weight falls within the above ranges, it is possible to have a norbornene type resin that is excellent in mechanical strength, solubility, moldability and processability for flow casting.

When the norbornene type resin is obtained by hydrogenating a ring-opened polymer of norbornene type monomer, the hydrogenating rate of the norbornene type resin used is generally 90% or more, preferably 95% or more and more preferably 99% or more in light of thermal degradation and light degradation.

As the polycarbonate type resin, an aromatic polycarbonate, which comprises an aromatic dihydric phenol component and a carbonate component. An aromatic polycarbonate can be obtained generally by the reaction of an aromatic dihydric phenol with a carbonate precursor. Specifically, an aromatic polycarbonate can be obtained by the phosgene process which involves blowing of phosgene into an aromatic dihydric phenol compound in the presence of caustic alkali and solvent, or by the ester exchange process which involves ester exchanging in the presence of a catalyst between an aromatic dihydric phenol compound and a bisaryl carbonate. Herein, examples of the carbonate precursor include phosgene, and bischloro-formate, diphenylcarbonate, di-p-trylcarbonate, phenyl-p-trylcarbonate, di-p-chlorophenylcarbonate or dinaphtylcarbonate, of the dihydric phenols. Of them, phosgene and diphenylcarbonate are preferable.

Examples of the aromatic dihydric phenol compound to be reacted with the carbonate precursor include 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-dimethylphenyl)butane, 2,2-bis(4-hydroxy-3,5-dipropylphenyl)propane, 1,1-bis(4-hydroxyphenyl)cyclohexane, 1,1-bis(4-hydroxyphenyl)-3,3, 5-trimethylcyclohexane. These may be used alone or in combination of two or more thereof. Of them, 2,2-bis(4-hydroxyphenyl)propane, 1,1-bis(4-hydroxyphenyl)cycrohexane, 1,1-bis(4-hydroxyphenyl)-3,3,5-trimethylcyclohexane are preferable. Further, 2,2-bis(4-hydroxyphenyl) propane is more preferable. Particularly, it is preferable to use 2,2-bis(4-hydroxyphenyl)propane in combination with 1,1-bis(4-hydroxyphenyl)-3,3,5-trimethylcyclohexane.

When 2,2-bis(4-hydroxyphenyl)propane, 1,1-bis(4-hydorxyphenyl)-3,3,5-trimethylcyclohexane are used in combination, it is possible to adjust Tg (glass-transition temperature), photoelastic coefficient or the like, of a polymer film by changing the proportion of the components.

It is possible to increase Tg and decrease the photoelastic coefficient by increasing the content of 1,1-bis(4-hydroxyphenyl)-3,3,5-trimethylcyclohexane in a polycarbonate type resin. It is preferable to contain 1,1-bis(4-hydroxyphenyl)-3,3,5-trimethylhexane and 2,2-bis(4-hydroxyphenyl) propane in a polycarbonate type resin in the proportion of generally 8:2 to 2:8, preferably 8:2 to 4:6, more preferably 7:3 to 5:5, and most preferably 6:4.

The number average molecular weight (Mw) of the polycarbonate type resin is in the range of generally 25,000-200, 000, preferably 30,000-150,000, more preferably 40,000-100,000, and most preferably 50,000-80,000. It is possible to obtain a birefringent film having excellent mechanical strength and reliability by having the number average molecular weight of the polycarbonate resin falling within the above ranges.

It is not necessary to limit the cellulose type resin to a specific one, provided that it is any ester of cellulose with an acid. Of them, preferably used is ester of cellulose with fatty acid, such as cellulose triacetate, cellulose diacetate, cellulose tripropionate and cellulose dipropionate. When in use for optics, cellulose triacetate among them is preferable in light of low birefringence and high transmittance. Examples of commercially available cellulose triacetate include "UV-50", "SH-50", "UV-80", "SH-80", "TD-80U", "TD-TAC" and "UZ-TAC" manufactured by Fuji Photo Film Co., Ltd., "Cellulose Triacetate 80 μm Series" manufactured by Konica Corporation, and "Cellulose Triacetate 80 μm Series" manufactured by Lonza Japan Ltd.

On the other hand, as the substrate on which the polymer film is laminated, a light transmissive film, which can be stretched and shrunk, is preferable, and a film, which does not cause retardation even after being stretched, is particularly preferable from the view point of practical use. Particularly, a film, which has an excellent transmittivity, is preferable, since it is possible to directly use a laminate of the substrate and a birefringent film formed thereon, as an optical film. As the substrate, a previously stretched film or a heat shrinkable film is preferable in order to smoothly carry out the shrinking in the lengthwise direction. For example, a thermoplastic resin is preferable as a material thereof.

Examples of a material from which the substrate is made include polyethylene, polypropylene, polyolefin such as poly (4-methylpentine-1), polyimide, polyamideimide, polyamide, polyetherimide, polyetheretherketone, polyketonsulfide, polyethersulfone, polysulfone, polyphenylenesulfide, polyphenyleneoxide, polyethyleneterephthalate, polybutyleneterephthalate, polyethylenenaphthalate, polyacetal, polyarylate, acrylic resin, polyvinylalcohol, epoxy resin, phenol resin and the like, polyester resin, acrylic resin, polystyrene resin, polyvinyl alcohol resin, polyvinyl chloride resin, polyvinylidene chloride resin, polyacryl resin, or a mixture thereof. A liquid crystal polymer is also usable. Of them, it is preferable to use polypropylene, polyethyleneterephthalate, polyethylenenaphthalate and the like in light of solvent resistance, heat resistance and so on. Moreover, it is possible to use a mixture as described in Japanese Patent Application Publication No. 2001-343529 (WO 01/37007), which includes a thermoplastic resin whose side chain has a substituted or unsubtituted imido group and a thermoplastic resin whose side chain has a substituted or unsubtituted phenyl group and nitrile group, for example, a resin composition containing an alternating copolymer of isobutene and N-methyl maleimide and an acrylonitrile-styrene copolymer. Of these materials, it is preferable to use, for example, the aforesaid mixture of a thermoplastic resin whose side chain has a substituted or unsubtituted imido group and a thermoplastic resin whose side chain has a substituted or unsubtituted phenyl group and nitrile group.

Now, the description will be made for a method of manufacturing the birefringent film of this embodiment.

First, a polymer film, to which stretching and shrinking treatments are to be applied, is prepared. The thickness of the polymer film is not limited to a specific thickness and can be varied depending on a desirable retardation of a birefringent film to be manufactured, a material of the polymer film or the like. The thickness is in the range of generally 5-500 μm, preferably 10-350 μm and more preferably 20-200 μm. When the thickness falls within these ranges, the film exhibits a sufficient mechanical strength so that it is hardly cut or damaged during the stretching and shrinking treatments. The length in the lengthwise direction and the thickness in the widthwise direction are not necessarily limited but can be varied depending on the size of a stretching machine or the like to be used.

The polymer film is simultaneously subjected to the stretching treatment in the widthwise direction and the shrinking treatment in the lengthwise direction so as to satisfy the relational expression: $(1/STD)^{1/2} \leq SMD < 1$. These stretching and shrinking treatments respectively in the widthwise direction and the lengthwise direction can be made by using for example a biaxial stretching machine, such as a high-performance thin-film machine (trade name FITZ, manufactured by K.K. Ichikin Kogyo-sha) that can automatically perform the aforesaid stretching and shrinking operations. This machine allows for the settings of the desired stretching ratio of a vertical direction (the lengthwise direction of the film=the moving direction of the film) and the desired shrinking ratio of the widthwise direction (a widthwise direction=a direction perpendicular to the moving direction of the film) as well as the setting of the desired shrinking ratio of the vertical direction (lengthwise direction), and thus is capable of simultaneously performing the stretching operation and the shrinking operation respectively in given conditions. It is possible to use a biaxial stretching machine that controls the stretching ratio of a film in the widthwise direction, while controlling the length of a film in the lengthwise direction by changing the distance of the gap between clips that hold the opposite ends of the film, for example by using generally known techniques in combination, such as a rail-width control technique, a pantograph technique, a technique of controlling the running speed of a linear motor, etc.

The temperature for the stretching and shrinking treatments is not necessarily limited but can be varied depending on the type of the polymer film. It is preferable to set the temperature according to the glass-transition temperature of the polymer film. Specifically, the temperature for the stretching and shrinking treatments is preferably in the range of plus or minus 30° C., and more preferably plus or minus 20° C., and most preferably plus or minus 10° C., of the glass-transition temperature.

The birefringent film of this embodiment can be provided from the polymer film by the aforesaid method, in which the birefringent film has an Nz coefficient of 0.9-1.1 and is excellent in uniformity of birefringence, retardation, orientation angles or other characteristics, and particularly excellent in uniformity of those characteristics in the widthwise direction. The value of birefringence or retardation of the birefringent film varies depending on, for example, the material, the stretching ratio or the like, of the polymer film, but is still excellent in uniformity of those characteristics regardless of the magnitude of birefringence, retardation or the like, provided that the birefringent film is manufactured based on the conditions represented by the aforesaid relational expression.

For the birefringent film, a variation of the in-plane retardation "$(nx-ny) \times d$" falls preferably within a range of not more than 4%, more preferably within a range of not more than 3.5% and most preferably within a range of not more than 3%. A variation of the thicknesswise retardation "$(nx-nz) \times d$" falls preferably within a range of not more than 5%, more preferably within a range of not more than 4.8% and most preferably within a range of not more than 4.7%. The variation of each retardation can be measured by the following procedure. First, a birefringent film is equally divided in the widthwise direction of thereof to have points equally spaced, and the in-plane retardation and thicknesswise retardation at each point are measured. Then, with the average value of them designated as 100%, the absolute value of the difference between the measured value at each point and the average value is calculated as the variation (%) of each of the in-plane retardation and the thicknesswise retardation.

For the birefringent film of this embodiment, the variation of the orientation angles in the X axis (the direction of the slow axis) is preferably not more than 2 degrees, more preferably not more than 1.9 degrees and most preferably not more than 1.8 degrees. The above method enables the control of the variation within these ranges and hence achieves improved uniformity of the refractive index. By the orientation angle is meant the angle between the direction of the slow axis and the stretching direction (widthwise direction) at a given point, which angle can be automatically calculated by using such as an automatic birefringence measuring apparatus (trade name KOBRA-21ADH, manufactured by Oji Scientific Instruments) at a wavelength of 590 nm, in which the aforesaid variation can be represented by the difference between the maximum value and the minimum value in absolute value, such as when the orientation angles were respectively measured at plural points in the same manner as in the measurement for the retardation. In the present invention, the birefringent film shows a large variation range in the widthwise direction thereof, which direction thus becomes the direction of the slow axis.

Although the thickness of the thus obtained birefringent film varies depending on the thickness, stretching ratio or the like of a polymer film to be used, it is generally within 5-500 μm, preferably within 10-350 μm and more preferably within 20-200 μm.

According to another method of manufacturing the birefringent film of the present invention, a polymer film selected from the group consisting of the norbornene type resin, the polycarbonate type resin and the cellulose type resin is laminated on a substrate to have a laminate, and this laminate is simultaneously subjected to the stretching treatment and the shrinking treatment. In this case, the laminate of the substrate and the polymer film may be stretched and shrunk with the opposite ends thereof held, or the polymer film may be stretched and shrunk indirectly through a substrate of the laminate, which is stretched and shrunk with the opposite ends of only the substrate held. Alternatively, these treatments may be applied only to the polymer film after it has been released from a substrate.

Now, the description will be made for the case where the polymer film is directly formed on a substrate. First, a resin selected from the norbornene type resin, the polycarbonate type resin and the cellulose type resin is dispersed or dissolved in a solvent to prepare a coating liquid. Although the concentration of the coating liquid is not necessarily limited to a specific concentration, it is preferable to have such as a concentration of the resin preferably in the range of 0.5-50 wt. %, more preferably in the range of 1-40 wt. % and most preferably in the range of 2-30 wt. % for a desirable viscosity allowing easy coating. For example, the amount of the resin to be added is preferably in the range of 5-50 wt.parts and more preferably in the range of 10-40 wt.parts relative to 100 wt.parts of the solvent.

Any type of solvent can be freely selected for the solvent used in the present invention according to the resin to be used, but, for example, a solvent that can solve the resin and is unlikely to wash away a substrate is preferable. Examples of the solvent include: halogenated hydrocarbons such as chloroform, dichloromethane, carbon tetrachloride, dichloroethane, tetrachloroethane, trichloroethylene, tetrachloroethylene, chlorobenzene, orthodichlorobenzene; phenols such as phenol, parachlorophenol; aromatic hydrocarbons such as benzene, toluene, xylene, methoxybenzen, 1,2-dimethoxybenzene; ketone solvent such as acetone, methyl ethyl ketone, methyl isobutyl ketone, cyclohexanone, cyclopentane, 2-pyrolidone, N-methyl-2-pyrolidone; ester solvent such as ethylacetate, butyl acetate; alcohol solvent such as t-butylalcohol, glycerin, ethyleneglycol, triethyleneglycol, ethyleneglycolmonomethylether, diethyleneglycoldimethylether, propylene glycol, dipropylene glycol, 2-methyl-2,4-pentanediol; amide solvent such as dimethylformamide, dimethylacetoamide; nitrile solvent such as acetonitrile, butyronitrile; ether solvent such as diethyl ether, dibutyl ether, tetrahydrofuran; carbon disulfide; ethylcellosolve, butylcellosolve; and sulfuric acid. These may be used alone or in combination of two or more.

Various additives such as surface active agents, stabilizers, plasticizers, metals or the like may be added into the coating liquid according to needs and circumstances.

Another resin may be added into the coating liquid in such a quantity that, for example, the orientation or other properties of a polymer film to be formed on a substrate does not significantly deteriorate. Examples of the resin to be added include various commodity resins, engineering plastics, thermoplastic resins and thermosetting resins.

Examples of the commodity resin include polyethylene (PE), polypropylene (PP), polystyrene (PS), polymethylmethacrylate (PMMA), ABS resin, and AS resin. Examples of the engineering plastics include polyacetate (POM), polyamide (PA: nylon), polyethylene terephthalate (PET) and polybutylene terephthalate (PBT). Examples of the thermoplastic resins include polyphenylene sulfide (PPS), polyethersulfone (PES), polyketone (PK), polyimide (PI), polycyclohexane-dimethanol terephthalate (PCT), polyarylate (PAR) and liquid crystal polymers (LCP). Examples of the thermosetting resins include epoxy resins and phenol novolak resins. When such a resin is added into the coating liquid, the quantity to be added is for example in the range of 0-50 wt. % and preferably in the range of 0-30 wt. %, relative to the aforesaid resin.

Then, the thus prepared coating liquid is applied on a surface of the substrate so as to form a thin coat of polymer film. Examples of the coating techniques of the coating liquid include spin coating, roll coating, printing, dip coating, curtain coating, wire bar coating, doctor blading, knife coating, die coating, gravure coating, micro gravure coating, offset gravure coating, lip coating and spray coating. As for the coating, a polymer layer may be alternatively laminated on the surface of the substrate, according to needs and circumstances.

Although the thickness of the substrate is not necessarily limited, it is generally not less than 10 μm, preferably in the range of 10-200 μm, more preferably in the range of 20-150 μm, and most preferably in the range of 30-100 μm. As long as the thickness is not less than 10 μm, the substrate has a sufficient strength during the later-described stretching and shrinking treatments so that it is possible to satisfactorily prevent the occurrence of uneven application of the stretching and shrinking treatments. When the thickness is not more than 200 μm, the stretching treatment can be made by an appropriate tension force.

Then, the thin coat formed on the substrate is dried. This drying allows the polymer film to be fixed on the substrate so that the polymer film can be directly formed on the substrate.

The drying is not necessarily limited to a specific technique but is achievable by a variety of techniques such as natural drying or heated air drying. The drying conditions may be appropriately determined based on the type of polymer film, the type of solvent or the like. For example, when the heated air drying is made, the temperature for it is generally in the range of 40° C.-250° C., and preferably in the range of 50° C.-200° C. The heated air drying for a thin coat may be made at a constant temperature or alternatively made stepwisely while increasing or decreasing the temperature. Although the time for the heated air drying is also not necessarily limited, it is generally in the range of 10 seconds to 60 minutes, and preferably in the range of 30 seconds to 30 minutes.

After the drying, the solvent left in the polymer film may deteriorate the optical characteristics with age in proportion to its quantity. In light of this, the residual quantity is generally not more than 5%, preferably not more than 2% and most preferably not more than 0.2%.

Although the thickness of a polymer film to be formed on the substrate is not necessarily limited, it is set generally in the range of 0.5-10 μm, preferably in the range of 1-8 μm and more preferably in the range of 1-7 μm.

Then, the polymer film formed on the substrate is simultaneously subjected to the stretching and shrinking treatments under the aforesaid conditions. In this case, the polymer film alone may be directly subjected to the stretching and shrinking treatments, or alternatively a laminate made up of the substrate and the polymer film may be entirely subjected to the stretching and shrinking treatments. In this regard, it is preferable to apply the treatment only to the substrate for the reasons stated hereinafter. That is, when only the substrate is subjected to the stretching and shrinking treatments, a polymer film formed on the substrate is indirectly stretched and shrunk. In general, it is possible to achieve uniform treatment when treatment is made not to a laminate but to a single layer. Therefore, when the treatment is made only to the substrate, the polymer film thereon can be evenly stretched and shrunk along with the substrate. Alternatively, it is also possible to treat only the polymer film after it has been removed from the substrate, as described above.

When formed on a substrate in the manner described above, the birefringent film of the present invention may be used in the form of a laminate made up with the substrate or in the form of a single layer after removed from the substrate. The birefringent film may be used in such a form obtained by removing a film from the substrate (hereinafter referred to a first substrate) and then again laminating or transferring the same on another substrate (hereinafter referred to a second substrate), which does not deteriorate the optical characteristics of the film, via an adhesive layer.

The second substrate is not necessarily limited to a specific material, provided that it has an appropriate planarity. For example, glass, polymer film that is transparent and has optical isotropy, or the like is preferable. Examples of the polymer film include a film made of polymethyl methacrylate, polystyrene, polycarbonate, polyether sulfone, polyphenyl sulfide, polyarylate, amorphous polyolefin, triacetyl cellulose (TAC), epoxy resin, or a resin composition containing an alternating copolymer of isobutene and N-methyl maleimide and an acrylonitrile-styrene copolymer. Of them, preferable are polymethyl methacrylate, polycarbonate, polyarylate, triacetyl cellulose (TAC), polyether sulfone, and a resin composition containing an alternating copolymer of isobutene and N-methyl maleimide and an acrylonitrile-styrene copolymer. Even a substrate having optical anisotropy may be used, depending on the intended use. Examples of such a substrate having optical anisotropy include a retardation film or a polarizing film formed by stretching a polymer film of such as polycarbonate, polystyrene or norbornene type resin.

As an adhesive of an adhesive layer to be formed for the above mentioned transferring, any adhesive may be used, provided that it can be used for the optical use. Specifically, acrylic adhesive, epoxy adhesive or urethane adhesive is usable.

An optical film of the present invention is not limited in structure, but can be varied such as by having a substrate as described above, as long as the optical film contains a birefringent film of the present invention as described above.

An optical film of the present invention preferably has an outermost layer on which an adhesive layer is provided, which adhesive layer allowing the optical film of the present invention to be easily bonded to another member such as another optical layer or a liquid crystal cell and hence preventing unintentional removal of the optical film. The adhesive layer may be provided on one side or both sides of the optical film of the present invention.

The adhesive layer is not necessarily limited in material, but for example, acrylic type, silicone type, polyester type or rubber type adhesive is usable. Also, it is possible to have these materials containing fine particles to provide a light diffusion layer. Of them, a material having excellent moisture absorption characteristics, heat resistance and so on is preferable. With these characteristics, when used such as in an LCD device, the optical film makes it possible to provide an LCD device with a high quality and an excellent durability, while preventing deterioration of the optical characteristics due to expansion, film peeling or the like resulting from the moisture absorption, or thermal expansion difference, as well as preventing warping of the liquid crystal cell.

The optical film of the present invention may be made of only the birefringent film of the present invention or a laminate with another optical member, which depends on the needs and circumstances. Examples of another optical member without limitation include a different birefringent film, a different retardation film, a liquid crystal film, a light diffusion film, a lens sheet, a diffraction film, a polarizing plate and a polarizing film.

When the optical film of the present invention includes the polarizing plate, the polarizing plate may be used alone or in the form of a laminate with a transparent protection layer (transparent protection film) provided on either or both sides thereof. Also, the optical film with the polarizing plate therein produces an effect of enhancing the front contrast and the contrast at oblique viewing angles when it is mounted in an LCD device.

When the birefringent film of the present invention is used in an LCD device along with a polarizing film, it is necessarily to arrange them with the slow axis of the birefringent film oriented substantially perpendicular to the absorption axis of the polarizing film. In general, the slow axis of the birefringent film corresponds to its stretching direction, while the absorption axis of the polarizing film corresponds to its stretching direction. The birefringent film of the present invention is manufactured by stretching a polymer film in the widthwise direction while at the same time moving the same in the lengthwise direction so as to be rolled up, thus having the slow axis corresponding to the stretching direction. A polarizing film is also manufactured by being stretched in the lengthwise direction while being rolled up. The rolled birefringent film and the polarizing film are drawn to have the opposite lateral sides (longitudinal edges) of the former one respectively positioned parallel or overlapped to the opposite lateral sides (longitudinal edges) of the latter one and successively laminated together (so called roll to roll lamination). Thus, the optical film can be manufactured.

When the optical film is manufactured by laminating the birefringent film with the polarizing film with the opposite lateral sides (longitudinal edges) positioned parallel or overlapped to each other, they are laminated to have the slow axis of the birefringent film oriented at an angle of 85 degrees to 95 degrees to the absorption axis of the polarizing film. As long as the angle falls within the range of 85 degrees to 95 degrees, it is possible to enhance the display quality of an LCD device using the thus obtained the optical film.

The polarizing film is not necessarily limited to a specific type, but a variety of films such as a film, which can be prepared by, for example, allowing a film to adsorb a dichroic material such as iodine or a dichroic dye, followed by stretching, cross-linking and drying, following a conventional technique, can be used. Of them, it is preferable to use a polarizing film that can transmit linearly polarized light when natural light is made incident thereon and that has excellent light transmittance and polarizing degree. Examples of the film in which the dichroic material is to be adsorbed include hydrophilic polymer films such as polyvinyl alcohol (PVA)-based films, partially-formalized PVA-based films, partially-saponified films based on ethylene-vinyl acetate copolymer and cellulose-based films. In addition to these films, polyene oriented films such as dehydrated PVA and dehydrochlorinated polyvinyl chloride can be used. Of them, the PVA-based film is preferable. In addition, the thickness of the polarizing film generally ranges from 1 to 80 μm although it is not limited to such a thickness.

For preparation of the optical film of the present invention by the lamination of the birefringent film and the polarizing film, adhesive or the like may be used for lamination. Examples of the adhesive include polymeric pressure sensitive adhesive such as of acrylic type, vinyl alcohol type, silicone type, polyester type, polyurethane type or polyether type, and rubber type pressure sensitive adhesive. It is also possible to use adhesive made of an aqueous crosslinker of a vinyl alcohol-based polymer such as glutaraldehyde, melamine or oxalic acid. Of them, it is preferable to use adhesive of the type that is hard to be influenced by temperature or heat and therefore hard to be removed, and provides high transmittance and high polarization degree. Specifically, when the polarizing film is made of a PVA based film, it is preferable to use PVA-based adhesive because of its high stability for a bonding treatment, or the like. These types of adhesive may be coated on a surface of the optical film used as a polarizing film or a transparent protection film, or may be used in the form of a layer such as a tape or sheet, which is disposed on the surface of the optical film.

The optical film, which has the birefringent film of the present invention, is preferably used to form a variety of display devices such as an LCD device. For example, the optical film is disposed on either or both sides of a liquid crystal cell to provide a liquid crystal panel to be used in an LCD device. The optical film is not limited to a specific arrangement and therefore can be arranged in the same manner as for an optical film which has a conventional birefringent film.

The LCD device is not particularly limited in type. For example, the LCD device may be formed as any type system such as an active matrix drive system, for example, using TFT (thin-film transistor) electrode or a MIM (Metal Insulator Metal) electrode, an IPS (in-plane switching) system, a PALC (plasma addressed liquid crystal display), a simple-matrix driving type represented by an TN (twisted nematic) type or a STN (super twisted nematic) type, or other types. Specific examples of the liquid crystal cell include an STN (super twisted nematic) cell, a TN (twisted nematic) cell, an IPS (in-plane switching) cell, a VA (vertical nematic) cell, an OCB (optically controlled birefringence) cell, a HAN (hybrid aligned nematic) cell, an ASM (axially symmetric aligned microcell) cell, a ferroelectric or antiferroelectric cell, and those to which orientation division was made in regular random order.

An LCD device with the optical film of the present invention may be of a transmission type with a backlight system, a reflection type with a reflection plate, or a projection type.

The optical film of the present invention may be applied to display devices other than the above-described LCD device, such as an EL (organic electroluminescence) display, a PDP (plasma display panel) and an FED (field emission display) or other light-emitting display devices. The arrangement is not necessarily limited, except that a conventional optical film is replaced by the optical film of the present invention.

EXAMPLES

Now, the description will be made for the present invention in more specific manner, with reference to Examples and Comparative Examples. It is to be noted that the present invention is not limited to these Examples. The respective characteristics were measured by the following procedures.

(Measurement of the Retardation and the Orientation Angular Distribution)

The retardation and the orientation angular distribution were measured at a wavelength of 590 nm by using an automatic birefringence analyzer (trade name KOBRA-21ADH, manufactured by Oji Scientific Instruments).

(Measurement of the Film Thickness)

The thickness of a birefringent film was measured by using an instaneous multi-photometric system (trade name MCPD-2000, manufactured by Otsuka Denshi Co., Ltd.).

Example 1

A birefringent film (thickness: 97 μm) was prepared by successively stretching a non-stretched norbornene-type film (trade name ZEONOR, manufactured by JSR Corporation) having a thickness of 100 μm and a width of 600 mm in the widthwise direction, while at the same time shrinking the same in the lengthwise direction, by using a high-performance thin-film machine (trade name FITZ, manufactured by K.K. Ichikin Kogyo-sha). The stretching temperature, the STD in the widthwise direction and the SMD in the lengthwise direction were respectively set at 135° C., 1.25 times and 0.90 times. By using an automatic birefringence measuring apparatus (trade name KOBRA-21ADH, manufactured by Oji Scientific Instruments), the in-plane retardation ($\Delta nd = (nx-ny) \times d$), the thicknesswise retardation ($Rth = (nx-nz) \times d$), and the orientation angular distribution, of the thus obtained birefringent film were measured at nine points in 50 mm intervals so as to be bilaterally symmetric in the widthwise direction. With respect to the in-plane retardation and the thicknesswise retardation, each average value was first calculated and then an NZ coefficient was calculated from the average value. The results are shown in Table 1. Herein, nx, ny and nz respectively represent refractive indices of the birefringent film in an X-axis (slow axis) direction, a Y-axis direction and a Z-axis direction, in which the X-axis direction corresponds to an in-plane axis direction to give a maximum refractive index, the Y-axis direction corresponds to an in-plane axis direction vertical to the X-axis, the Z-axis direction corresponds to a thickness direction vertical to the X-axis and the Y-axis, and d represents a thickness of the birefringent film.

Example 2

A birefringent film (thickness: 94 μm) was prepared in the same manner as Example 1 except that the SMD in the lengthwise direction was set at 0.93 times. The results are shown in Table 1.

Example 3

A birefringent film (thickness: 82 μm) was prepared in the same manner as Example 1 by using a non-stretched cellulose type film (trade name KA film, manufactured by Kaneka Corporation) having a thickness of 96 μm and a width of 600 mm. The stretching temperature, the STD in the widthwise direction and the SMD in the lengthwise direction were respectively set at 160° C., 1.5 times and 0.82 times. The results are shown in Table 1.

Comparative Example 1

A birefringent film (thickness: 90 μm) was prepared in the same manner as Example 1 except that the SMD in the lengthwise direction was set at 0.95 times. The results are shown in Table 1.

Comparative Example 2

A birefringent film (thickness: 84 μm) was prepared in the same manner as Example 1 except that the SMD in the lengthwise direction was set at 1.00 times. The results are shown in Table 1.

Comparative Example 3

A birefringent film (thickness: 72 μm) was prepared in the same manner as Example 3 by using a cellulose type film of Example 3 except that the SMD in the lengthwise direction was set at 1.00 times. The results are shown in Table 1.

Comparative Example 4

A birefringent film (thickness: 78 μm) was prepared in the same manner as Example 3 by using a cellulose type film of Example 3 except that the SMD in the lengthwise direction was set at 0.95 times. The results are shown in Table 1.

(Evaluation of a Birefringent Film in Actual Use)

Each of the birefringent films obtained in Examples and Comparative Examples is mounted in a liquid crystal cell to prepare a liquid crystal panel, and the difference in brightness in a white display state and a black display state, that is, the front contrast and the contrast at oblique viewing angles were measured. The front contrast was measured by using a luminance calorimeter (trade name BM-5A, manufactured by TOPCON CORPORATION) and the contrast at oblique viewing angles (polar angle: 60 degrees fixed, azimuth: average of 45 degrees and 135 degrees) was measured by using an EZ contrast 160D manufactured by ELDIM SA.

(Evaluation Test 1)

A birefringent film 20 obtained in Example 2 was laminated with a polarizing plate 10 (trade name SEG1425DU, manufactured by Nitto Denko Corporation) via adhesive to have the slow axis of the birefringent film 20 oriented at right angles (perpendicular) to the absorption axis of the polarizing plate 10 to provide a first laminate. Then, a liquid crystal cell 30 (a liquid crystal cell taken out from a 26 inches liquid crystal monitor, manufactured by Sharp Kabushiki Kaisha) was laminated via its surface (viewing surface) on a surface (a surface on which the polarizing plate is not laminated) of the birefringent film 20 of the laminate with adhesive. A retardation film 40 (trade name NAB-EF-SEG, manufactured by Nitto Denko Corporation, $\Delta$nd=0 nm, Rth=120 nm) is laminated with a polarizing plate 50 (trade name SEG1425DU, manufactured by Nitto Denko Corporation) via adhesive to provide a second laminate, which is in turn laminated on the opposite surface of the liquid crystal cell 30 (the side on

TABLE 1

| | FILM | STRETCHING TEMPERATURE (° C.) | STD STRETCHING RATIO (TIMES) | $(1/STD)^{1/2}$ VALUE | SMD STRETCHING RATIO (TIMES) | $\Delta$nd (NM) AVERAGE VALUE | $\Delta$nd (NM) DISTRIBUTION *1 |
|---|---|---|---|---|---|---|---|
| EXAMPLE 1 | NORBORNENE TYPE | 135 | 1.25 | 0.894 | 0.90 | 110.4 | 3.2 |
| EXAMPLE 2 | NORBORNENE TYPE | 135 | 1.25 | 0.894 | 0.93 | 103.2 | 2.5 |
| EXAMPLE 3 | CELLULOSE TYPE | 160 | 1.5 | 0.816 | 0.82 | 97.0 | 3.5 |
| COMPARATIVE EXAMPLE 1 | NORBORNENE TYPE | 135 | 1.25 | 0.894 | 0.95 | 83.5 | 8.5 |
| COMPARATIVE EXAMPLE 2 | NORBORNENE TYPE | 135 | 1.25 | 0.894 | 1.00 | 65.7 | 8.8 |
| COMPARATIVE EXAMPLE 3 | CELLULOSE TYPE | 160 | 1.5 | 0.816 | 1.00 | 37.1 | 6.1 |
| COMPARATIVE EXAMPLE 4 | CELLULOSE TYPE | 160 | 1.5 | 0.816 | 0.95 | 59.4 | 7.5 |

| | Rth (NM) AVERAGE VALUE | Rth (NM) DISTRIBUTION *1 | ORIENTATION ANGULAR DISTRIBUTION (°) *1 | Nz COEFFICIENT (Rth/$\Delta$nd) | THICKNESS (μm) |
|---|---|---|---|---|---|
| EXAMPLE 1 | 107.7 | 5.1 | 1.8 | 0.98 | 97 |
| EXAMPLE 2 | 107.2 | 4.8 | 1.5 | 1.04 | 94 |
| EXAMPLE 3 | 102.1 | 4.5 | 1.7 | 1.05 | 82 |
| COMPARATIVE EXAMPLE 1 | 101.3 | 10.2 | 2.5 | 1.21 | 90 |
| COMPARATIVE EXAMPLE 2 | 119.8 | 12 | 3.5 | 1.82 | 84 |
| COMPARATIVE EXAMPLE 3 | 91.9 | 10.2 | 4.3 | 2.48 | 72 |
| COMPARATIVE EXAMPLE 4 | 139.4 | 11.5 | 2.9 | 2.35 | 78 |

*1: "Distribution" means max · min.

which a backlight was installed) via a surface of the birefringent film 40, on which the polarizing plate 50 is not laminated. Thus, a liquid crystal panel was obtained.

The retardation film 40 (trade name NAB-EF-SEG, manufactured by Nitto Denko Corporation) was laminated with the polarizing plate 10 (trade name SEG1425DU, manufactured by Nitto Denko Corporation) to have the slow axis oriented at 90 degrees to the absorption axis in a VA mode. FIG. 1 illustrates a cross sectional view of the thus obtained liquid crystal panel. The lamination of the respective members was made by using acrylic pressure sensitive adhesive (thickness: 20 μm). The front contrast and the contrast at the oblique viewing angle, of the liquid crystal panel were respectively 580 and 28.

(Evaluation Test 2)

A liquid crystal panel was obtained in the same manner as Evaluation Test 1 by using a birefringent film obtained in Comparative Example 1. The front contrast and the contrast at the oblique viewing angle, of the liquid crystal panel were respectively 450 and 15.

Table 2 shows the combined results of Evaluation Tests 1 and 2.

TABLE 2

| | FILM IN ACTUAL USE | RESULTS OF THE EVALUATION | |
|---|---|---|---|
| | | FRONT CONTRAST | CONTRAST AT OBLIQUE VIEWING ANGLE |
| EVALUATION TEST 1 | EXAMPLE 2 | 580 | 28 |
| EVALUATION TEST 2 | COMPARATIVE EXAMPLE 1 | 450 | 15 |

It was found from the evaluation results that a liquid crystal panel having an enhanced image display quality (being excellent in the front contrast and the contrast at oblique viewing angles) is obtainable.

This specification is by no means intended to restrict the present invention to the preferred embodiments set forth therein. Various modifications to the method of manufacturing a birefringent film, optical film using the same, liquid crystal panel, LCD device and image display device, as described herein, may be made by those skilled in the art without departing from the spirit and scope of the present invention as defined in the appended claims.

What is claimed is:

1. A method of manufacturing a birefringent film comprising stretching a polymer film in a widthwise direction while at the same time shrinking the same polymer film in a lengthwise direction, wherein the widthwise direction is a direction perpendicular to the lengthwise direction, so as to satisfy the relational expression: $(1/STD)^{1/2} \leq SMD < 1$, in which the length in the widthwise direction and the length in the lengthwise direction, of said polymer film before being stretched are respectively designated as 1, and STD represents a change ratio of the length in the widthwise direction of said polymer film due to stretching and SMD represents a change ratio of the length in the lengthwise direction of said polymer film due to shrinking, and make the stretched polymer film have an Nz coefficient of 0.9-1.1, where $Nz=(nx-nz)/(nx-ny)$, in which nx=maximum in-plane refractive index of the polymer film, ny=in-plane refractive index in a direction crossing at right angles to an in-plane nx direction that gives the maximum in-plane refractive index of the polymer film, and nz=thickness-wise refractive index in a direction crossing at right angles to a refractive index angle of nx and a refractive index angle of ny of the polymer film, and the stretching treatment and the shrinking treatment which are to be made simultaneously are indirectly applied to the polymer film, by laminating the polymer film on a substrate and simultaneously applying the stretching and shrinking treatments to the substrate, where the stretching ratio of the polymer film in the widthwise direction is controlled while simultaneously controlling the shrinking length of the polymer film in the lengthwise direction by changing the distance between the opposite ends of the substrate.

2. The method of manufacturing a birefringent film according to claim 1, wherein said polymer film contains at least one selected from the group consisting of norbornene type resin, polycarbonate type resin and cellulose type resin.

\* \* \* \* \*